US005615105A

United States Patent [19]
Tofigh et al.

[11] Patent Number: 5,615,105
[45] Date of Patent: Mar. 25, 1997

[54] MULTICHANNEL POWER DISTRIBUTION SYSTEM

[75] Inventors: Farshid Tofigh, Misson Viejo; Parminder S. Brar, Huntington Beach; Yen-Kuei Tsao, Hacienda Heights; Evan Clements, Dana Point, all of Calif.; Joseph Maier, Wechingen, Germany

[73] Assignee: Leach Corporation, Buena Park, Calif.

[21] Appl. No.: 271,843

[22] Filed: Jul. 7, 1994

[51] Int. Cl.$^6$ ................................ G05B 11/01; H02J 3/10
[52] U.S. Cl. .................... 364/138; 364/141; 364/492; 307/31
[58] Field of Search ..................... 364/138, 141, 364/143, 492; 340/825.06, 825.21; 307/11, 31

[56] References Cited

U.S. PATENT DOCUMENTS

| | | | |
|---|---|---|---|
| 3,842,249 | 10/1974 | Geyer et al. | 364/138 |
| 4,213,182 | 7/1980 | Eichelberger et al. | 364/493 |
| 4,347,575 | 8/1982 | Gun et al. | 364/492 |
| 4,357,665 | 11/1982 | Korff | 364/492 |
| 4,794,371 | 12/1988 | Yamamoto | 340/825.64 |
| 4,835,706 | 5/1989 | Asahi | 364/492 |
| 5,323,307 | 6/1994 | Wolf et al. | 364/140 |

FOREIGN PATENT DOCUMENTS 3346272 12/1983 Germany.
PCT/US87/
02371 9/1987 WIPO.

OTHER PUBLICATIONS

"Final Technical Report for Remote Power Controller and Bus Isolator (NAS3-24660)" prepared for NASA-Lewis Research Center, Cleveland, Ohio by Leach Corporation, Power Management Group, Nov. 10, 1988.
Declaration of Farshid Tofigh dated Feb. 6, 1995.

*Primary Examiner*—Paul P. Gordon
*Attorney, Agent, or Firm*—Darby & Darby, P.C.

[57] ABSTRACT

A multichannel power distribution system for individually controlling power from a source to a plurality of loads has individual power control devices and at least one logic stage responsive to status signals to impose preselected operational characteristics on the devices. In one embodiment, isolation circuitry is provided between the power control devices and the logic stage. The isolation circuitry then includes a modulator for converting the status signal to a status pulse train of modulated pulse width, and the logic stage includes decoder logic for measuring the pulse width of the status pulse train. In another embodiment, the logic stage is programmable to alter the operational characteristics of the devices in response to external inputs.

47 Claims, 7 Drawing Sheets

FIG. 6B ic MULTICHANNEL POWER DISTRIBUTION SYSTEM

BACKGROUND OF THE INVENTION

This invention relates to power distribution systems and, more particularly, to a multichannel power distribution system for individually controlling power to a plurality of loads.

A variety of systems have been proposed for controlling the distribution of power to individual loads, particularly in large vehicular systems, such as aircraft. When each load is controlled and/or protected by a separate, stand-alone apparatus, the distribution of power is conceptually simple, but suffers from certain operational disadvantages. Such systems are highly redundant, for example, and do not permit any great degree of coordination or adaptability. For these reasons, attempts have been made to implement more sophisticated control schemes.

Before power to a large number of loads can be distributed by a single integrated system, however, individual power switching devices must be isolated electrically from any common control or "logic" stage. Unfortunately, the limited bandwidths and nonlinear characteristics of conventional isolation circuitry present serious operational problems in the context of a power distribution system. For example, conventional optocouplers in conjunction with voltage-to-frequency converters operate well only within a relatively limited range of approximately four kilohertz to approximately twenty kilohertz, and the output of an optocoupler can normally be decoded only by counting the digital pulses of the output itself. This causes the decoding process, and therefore the reaction time of any associated electronic control, to be very slow.

Prior power distribution systems have also required power switching devices of different designs for each different power rating. A large number of spare parts must then be stocked over the life of the system, complicating both manufacture and installation.

Therefore, it is desirable in many applications to provide a power distribution system and method which isolates any control logic from switching elements without interfering with the efficient communication of status information and commands between different components of the system. It is also desirable to reduce the cost of manufacturing and maintaining such a system.

SUMMARY OF THE INVENTION

The present invention comprises, in one embodiment, a multichannel power distribution system and method for controlling power from at least one source to a plurality of loads, comprising: a plurality of power control devices each connectable between at least one source and one of the loads the power control devices providing at least one status signal representative of current or voltage at the load; at least one logic stage responsive to the status signals to impose preselected operational characteristics on the power control devices; and isolation circuitry between the power control devices and the logic stage; the isolation circuitry having a modulator for converting the status signal to a status pulse train of modulated pulse width; and the logic stage including decoder logic for measuring the pulse width of the status pulse train. In a more particular form, the modulator comprises a voltage-to-frequency converter connected to an optoisolator to produce a digital signal having a pulse width representative of the current through one of the loads. The decoder logic can then measure the pulse width on a pulse-by-pulse basis by counting the number of relatively rapid clock pulses occurring during each period of the status pulse train. In another embodiment, the logic stage of the power distribution system is programmable to alter the operational characteristics of the power control devices in response to an external input. The logic stage can be programmed from a remote location, preferably by software control, either when the system is set up or as it operates to control power to its loads.

The system and method of the present invention provide fast and accurate operation, due in part to the decoding scheme by which a pulse-width modulated status signal is transformed into a signal representative of load current or voltage during a single period of the pulse-width modulated signal. This eliminates the delay encountered in prior art systems which must count the pulses of the modulated signal itself to decode the information. It also provides an extremely accurate method of encoding and decoding information within the relatively small bandwidth of optoisolators.

The system of the present invention can also be programmed dynamically to establish the load ratings and trip characteristics of each of its power control devices, permitting all of the power control devices to be identical, if desired, to reduce manufacturing and inventory costs.

BRIEF DESCRIPTION OF THE DRAWINGS

The above and other features of the present invention may be more fully understood from the following detailed description, taken together with the accompanying drawings, wherein similar reference characters refer to similar elements throughout and in which.

DESCRIPTION OF THE PREFERRED EMBODIMENTS

Figure 1:
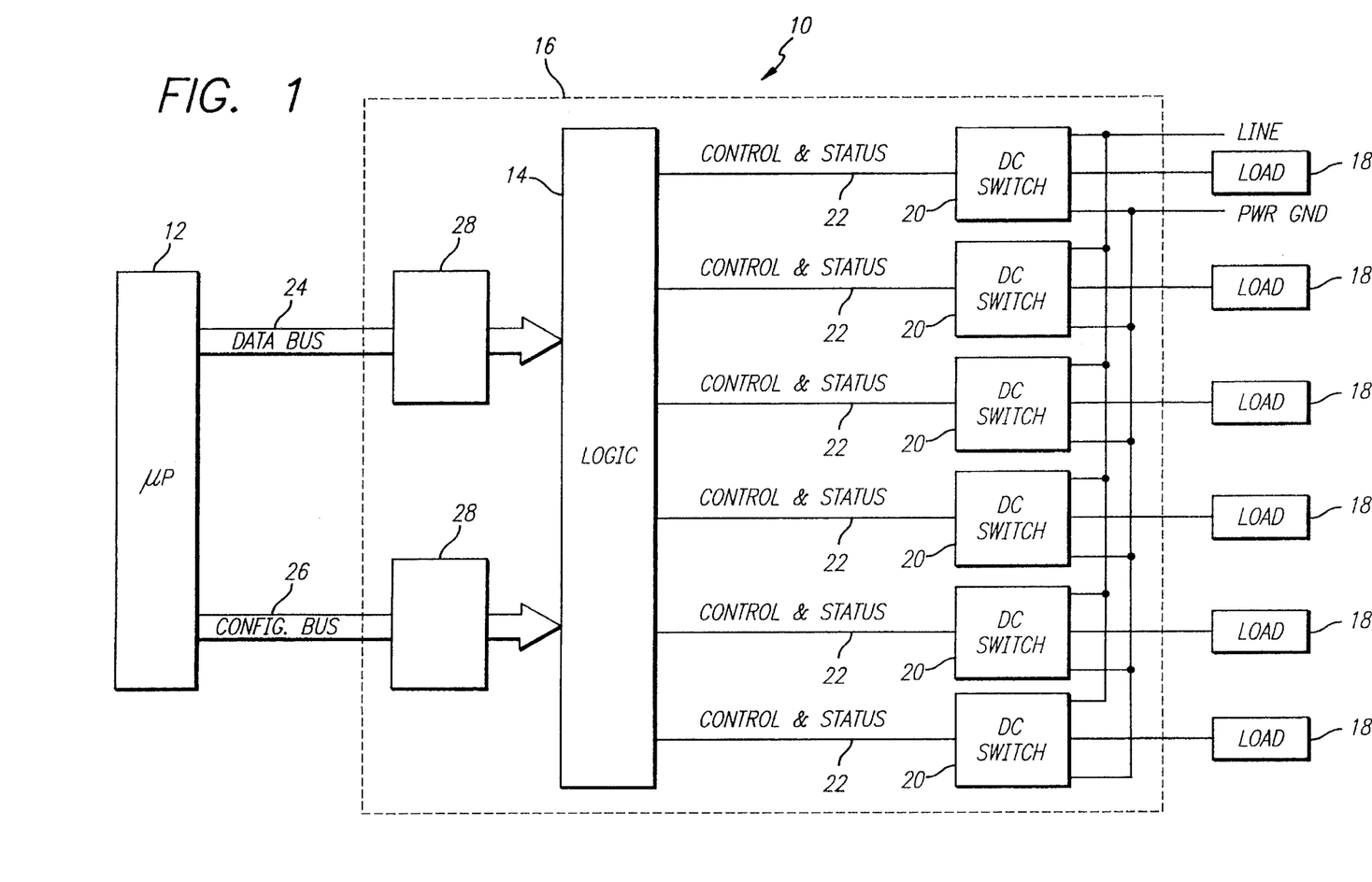
FIG. 1 is a simplified block diagram of a multichannel system constructed according to one embodiment of the present invention and specifically designed to distribute DC power.

Referring now to the drawings, specifically FIG. 1, one form of power distribution system 10 constructed in accordance with the present invention has a system microprocessor 12 which communicates with a logic section 14 of a power distribution module 16 to control the distribution of DC power to a plurality of external loads 18. Although the system 10 is shown and described herein as having only a single power distribution module 16, in practice the system may have a very large number of such modules to control a vast electrical system. Each module then operates in the same way and is controlled in global fashion by the system microprocessor 12.

As described in more detail later, the logic section 14 of the power distribution module 16 communicates with a plurality of DC power control devices or "switches" 20 along a plurality of control and status lines 22 to control power to the loads 18. Status signals indicative of the currents and/or voltages at the loads 18 are generated by circuitry within the power control devices 20 and communicated to the logic section 14 through isolation circuitry (not shown in FIG. 1) and the control and status lines 22. These signals are encoded by the power control devices 20 to accommodate the isolation circuitry, and are decoded by the logic section 14 to accurately indicate the status of the load. The logic section 14 monitors the status (usually current) at the load and commands the appropriate power control device 20 to trip (open) whenever an overcurrent condition exists for a time period sufficiently long to exceed a programmed trip characteristic of the device. The trip function is operated under program control of the system microprocessor 12 and can be reprogrammed at any time during its operation.

The system microprocessor is responsible for activation of the system, as well as imposing desired power ratings and trip characteristics on the logic section 14 and the power control devices 20. Communications with the system microprocessor take place along a data bus 24 and a module select and configuration bus 26, each acting through an appropriate buffer 28.

Figure 2:
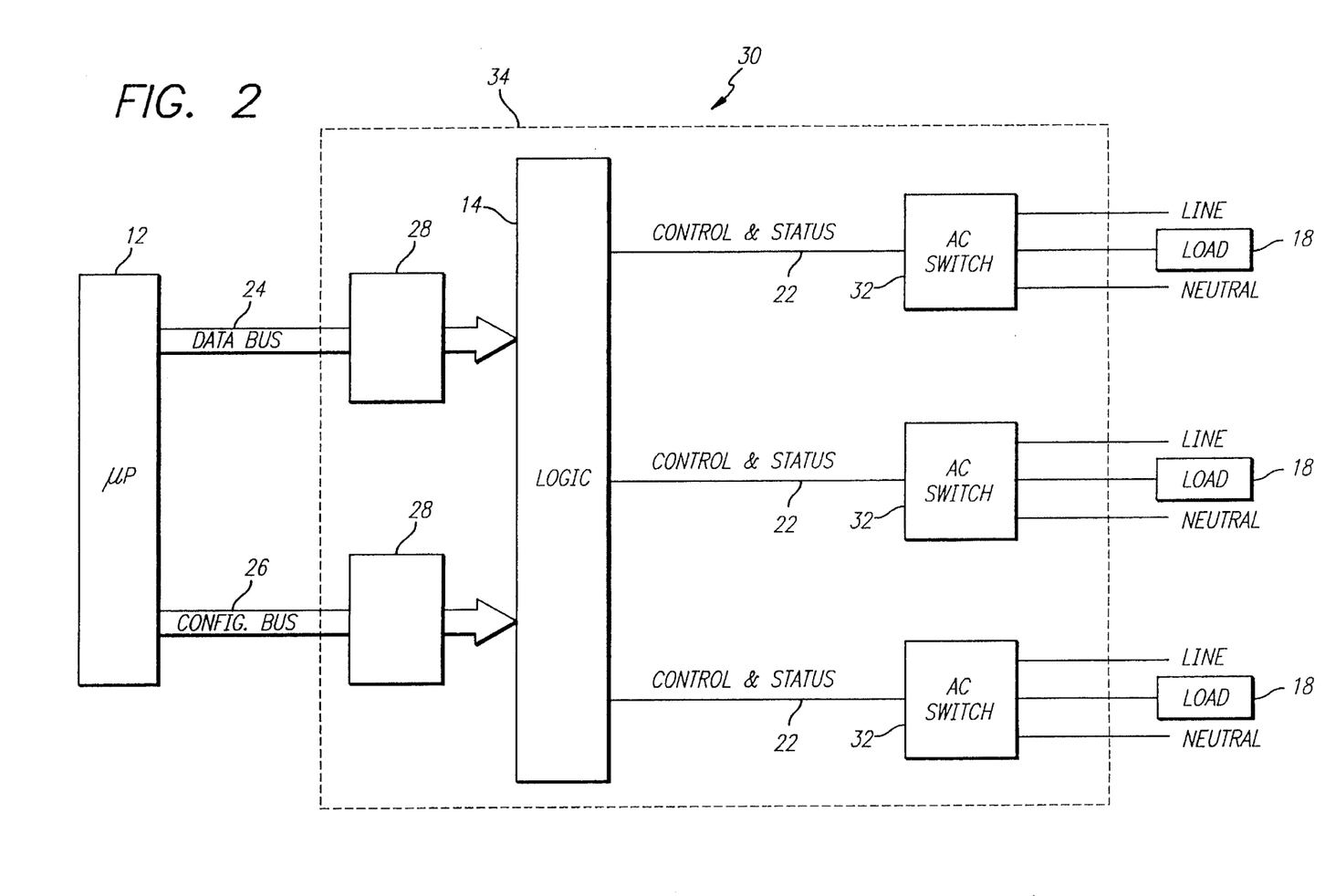
FIG. 2 is a simplified block diagram of a multichannel system constructed according to another embodiment of the present invention and specifically designed to distribute AC power.

Alternatively, the system of the present invention can take the form of a power distribution system 30, which is illustrated in FIG. 2, for distributing and controlling alternating current (AC) power. The power distribution system 30 also has a system microprocessor 12 which communicates with a logic section 14 over appropriate data buses to control a plurality of AC power control devices (switches) 32. Although most elements of the power distribution system 20 are the same as those of the system 10 of FIG. 1, the AC power control devices 32 differ from the DC power control devices 20 in several ways. Most notably, the AC power control devices 32 require two different switching elements, as described in more detail later, to accommodate the two directions of alternating current. Thus, the AC power distribution module 34 of the system 30 is physically different from the DC power distribution module 16, but operates in much the same way. In fact, DC power distribution modules and AC power distribution modules can be combined in a single power distribution system to accommodate both types of electrical power. Because the sensing and overcurrent trip functions are performed entirely within the modules, the microprocessor 12 can deal with the two types of modules in the same way.

Figure 4:
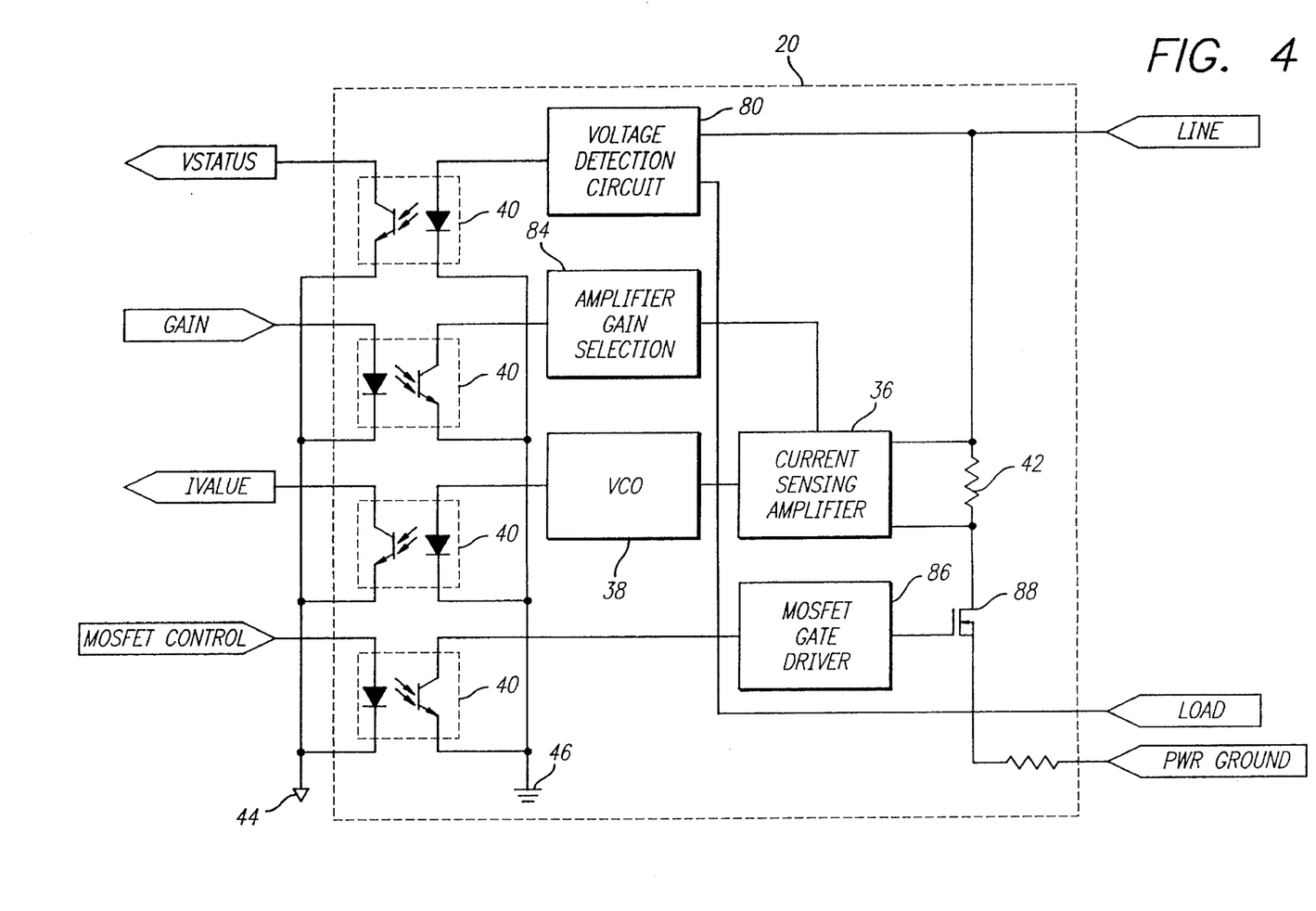
FIG. 4 is a block diagram of a DC power control device or switch of the system illustrated in FIG. 1.
Figure 5:
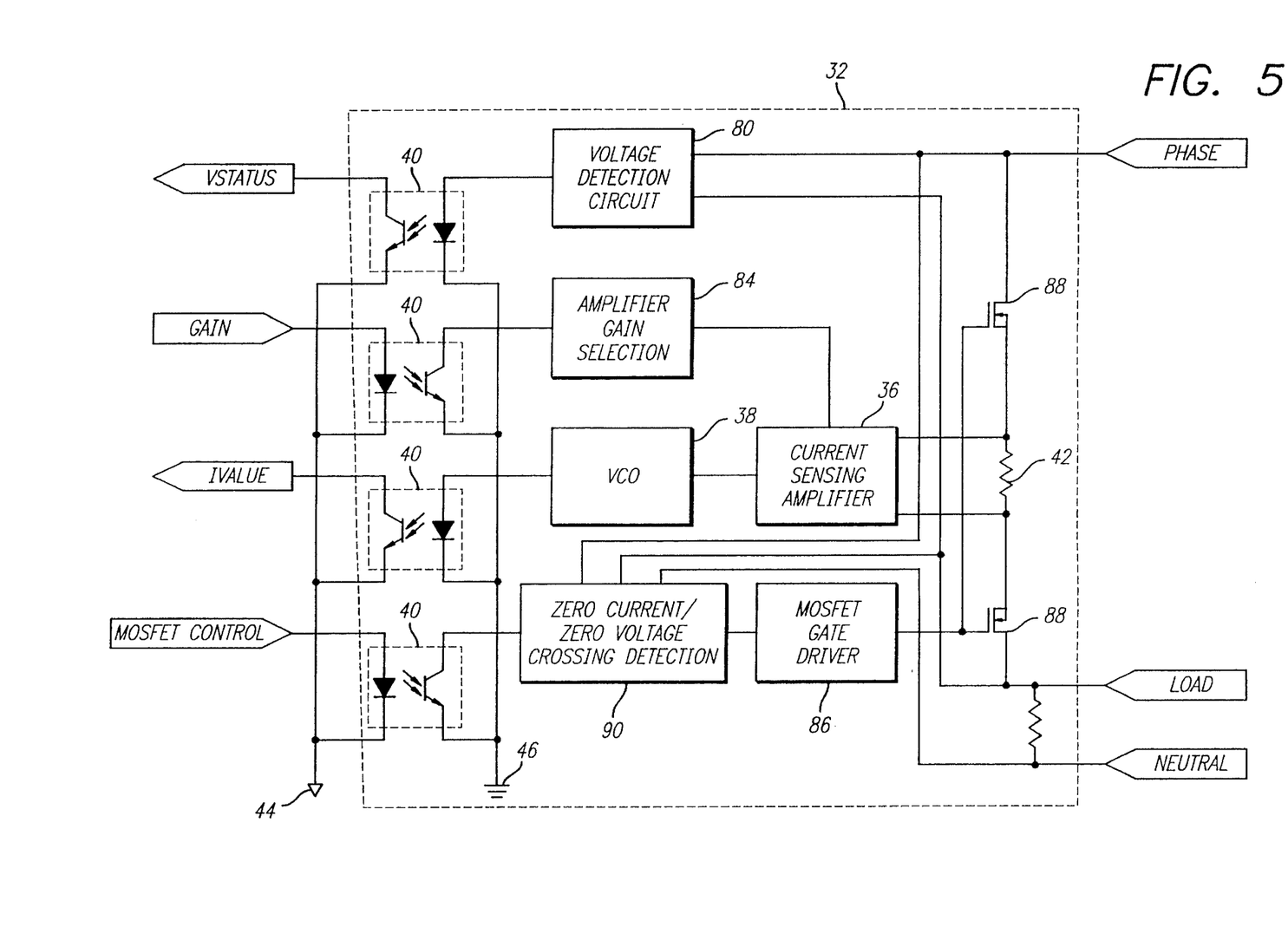
FIG. 5 is a block diagram of an AC power control device or switch of the system illustrated in FIG. 2.

Referring now to FIGS. 4 and 5, current through each load is sensed by a current sensing amplifier 36 within the corresponding power control device, and is translated into a digital format by a voltage-controlled oscillator (VCO) 38 for reading across isolation circuitry 40. The VCO 38 creates a pulse-width modulated digital signal in which frequency increases with the input voltage. The amplifier 36 is connected across a shunt resistor 42 to detect the current through the load and convert it to a voltage signal.

The isolation circuitry 40 is made up of a series of optocouplers, or "optoisolators", which provide electrical isolation between the logic section 14 and the sensing and switching elements of the power control devices. This is reflected in the drawings by a logic ground 44 which is entirely separate from a power ground 46. Four isolators are used to accommodate the various sensing and control functions of the system, as described in more detail below.

Unfortunately, optocouplers and other suitable coupling elements carry certain inherent operational limitations, including relatively low response times and nonlinearities in some ranges. These considerations combine to limit the useful operating range or "bandwidth" for accurate, linear operation across the couplers. In the case of optocouplers used in conjunction with the voltage-to-frequency converters, a preferred range for linear response is between approximately four and approximately twenty kilohertz. The system of the present invention therefore transmits load current information (IVALUE) across the isolation circuitry 40 as a pulse-width modulated digital signal within this window.

Figure 3:
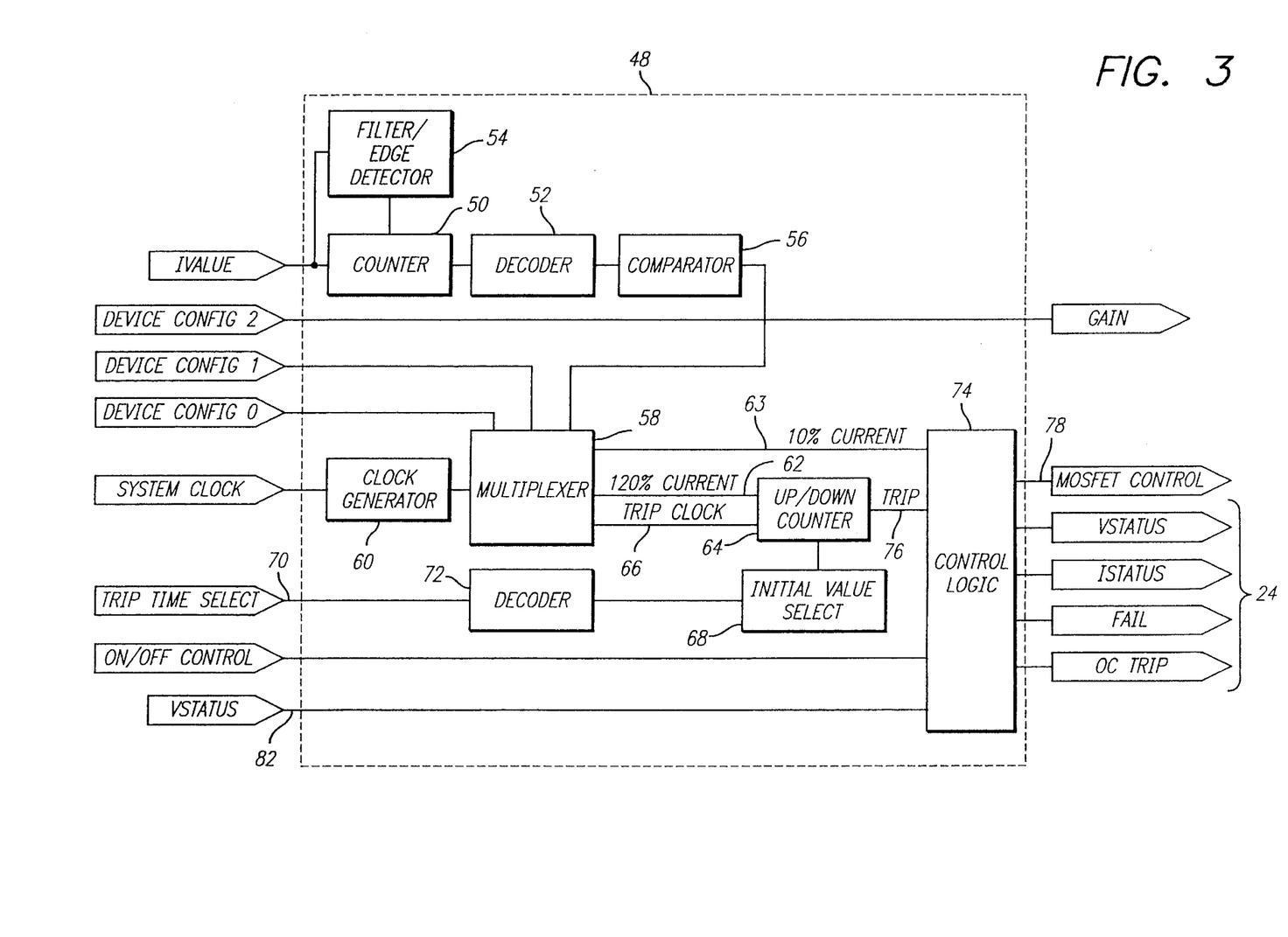
FIG. 3 is a block diagram of a logic stage of the power control systems of FIGS. 1 and 2.

FIG. 3 illustrates a logic portion 48 which is a segment of the logic section 14 dealing with a particular power control device from which a pulse-width modulated IVALUE signal emanates. In practice, the logic section 14 is a gate array or other logic structure having a logic portion 48 for each of its power control devices. Thus, the individual logic portions 48 of the logic section operate independently to concurrently process the status signals generated by the power control devices 20 and 32.

With reference now to the specific logic portion 48 illustrated in FIG. 3, the pulse-width modulated digital signal IVALUE, which is a pulse-train of modulated pulse-width indicating the current through the load, is decoded and compared to a plurality of "current" values programmed within the power control device 20 or 32 to indicate whether an overcurrent condition exists. The logic portion 48 acts in response to this detected current signal to generate a train of trip clock pulses at a rate representative of the current through the load. In addition, the detected current is used to generate an overcurrent signal indicative of whether the current through the load exceeds a rated value by at least a preselected amount. An up/down counter having a preselected start value is then used to integrate the trip clock pulses depending on whether an overcurrent condition exists. When the up/down counter reaches a second predetermined value, which is zero in one specific embodiment of the invention, a trip signal is transmitted to the power control device 20 or 32 to open the circuit to the corresponding load.

Considering the logic portion 48 in more detail, the pulse-width modulated input signal IVALUE is decoded by a counter 50 and a decoder 52 to yield a value representative of the current flowing in the load. More specifically, a filter/edge detector 54 detects a rising edge of each IVALUE pulse and filters the signal to eliminate noise. Each rising edge is detected and used to generate a pulse which resets the counter 50. Upon receiving a "reset" signal from the edge detector 54, the counter 50 begins counting at a relatively fast rate (preferably at least approximately 2 megahertz) until the next "reset" signal. The counter value is then latched as a 9-bit word at the counter output and the device begins its next count.

The decoder 52 converts the latched value to a form useful for comparison purposes and passes it on to the comparator 56 where it is compared to 19 preset threshold levels representing possible load currents. When the latched value exceeds one of the thresholds, the output of that portion of the comparator goes high. The output of the comparator 56 is therefore indicative of load current at a particular point in time and is applied to a series of lines (shown conceptually as a single line) representing various current levels. The signal on each line is therefore "high" if the detected current is at or above its preset value, and "low" if the current is below that value.

The output of the comparator 56 is applied to a multiplexer 58, as are two device configuration inputs identified in FIG. 3 as DEVICE CONFIG 0 and DEVICE CONFIG 1. These inputs determine the current rating of a power control device and the type of trip curve to be followed, respectively. The final input to the multiplexer 58 is from a clock generator 60 which divides the system clock signal (preferably approximately 2 megahertz) into a plurality of separate timing strings of different preselected frequencies. Although the drawings show a single line connecting the clock generator 60 and the multiplexer 58, this is also preferably accomplished by a plurality of individual conductors on which the timing strings are imposed.

The multiplexer 58 operates at two distinct levels. At a first level, it uses the 2-bit DEVICE CONFIG inputs to select a proper set of outputs of the comparator 56, those outputs representing the load current rating of the power control device 20 or 32. This effectively calibrates the detected current signal, enabling the multiplexer 58 to function as intended by the system microprocessor 12. In this context, the multiplexer 58 outputs along a line 62 a digital signal indicative of whether or not the detected current is at least 120 percent of the "rated" current of the power control device. A "high" signal on the output 62 is therefore indicative of an overcurrent condition with respect to the rated output of the power control device, whereas a "low" signal indicates that the current is within its acceptable range. At the same time, the multiplexer outputs a "status" signal along a line 63 indicating that a current at least 10% of rated current is passing through the load circuit.

At a second level, the multiplexer 58 uses the signals along the selected comparator lines to select one of the eight clock frequencies received from the clock generator 60 and pass it to an up/down counter 64 along a line 66 as the "trip" clock. The frequency of the trip clock is therefore a measure of the severity of the overcurrent condition, i.e., whether the current is 120 percent, 140 percent, or any percentage up to approximately 1000 percent, of rated current.

The up/down counter 64 is provided with an initial value, which is also its maximum possible value, by an initial value select circuit 68 programmed by the system microprocessor 12 through a trip time select input 70 and a decoder 72. The up/down counter 64 serves to count up or down at the rate established by the trip clock 66 and in the direction dictated by the overcurrent signal on the line 62. When the overcurrent signal is "high", signifying an overcurrent condition, the counter 64 counts down from its programmed initial value, eventually reaching zero if the overcurrent continues. If the overcurrent ceases before the counter reaches zero, the up/down counter 64 begins counting up at the rate of the trip clock until the maximum programmed value of the counter is reached. The rate at which the trip clock counts is, of course, determined by the extent of the overcurrent condition, causing the counter to reach zero rapidly if the current is extremely high. On the other hand, the counter takes a much longer time to reach zero if the current is only slightly above its acceptable operating range. In any case, when a zero count is reached, a trip signal passes to a control logic 74 along an output line 76. The signal causes the control logic 74 to send a trip signal of its own along an output 78 to the power MOSFET(s) of the associated power control device.

Figure 6A:
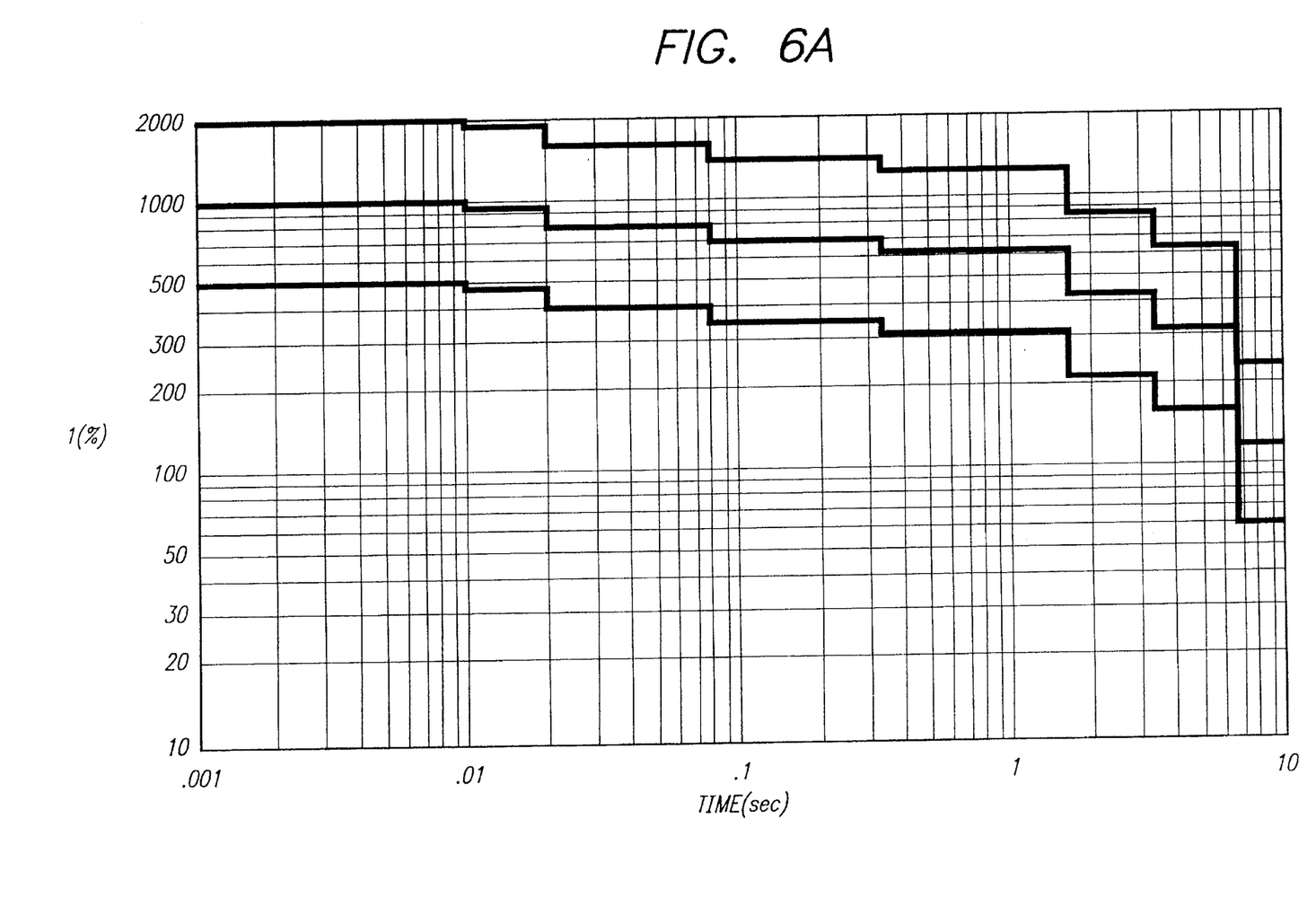
FIG. 6A is a graph of a series of curves representing trip characteristics implemented by a power distribution system constructed according to the invention, the curves differing only in the magnitude of permissible load current.
Figure 6B:
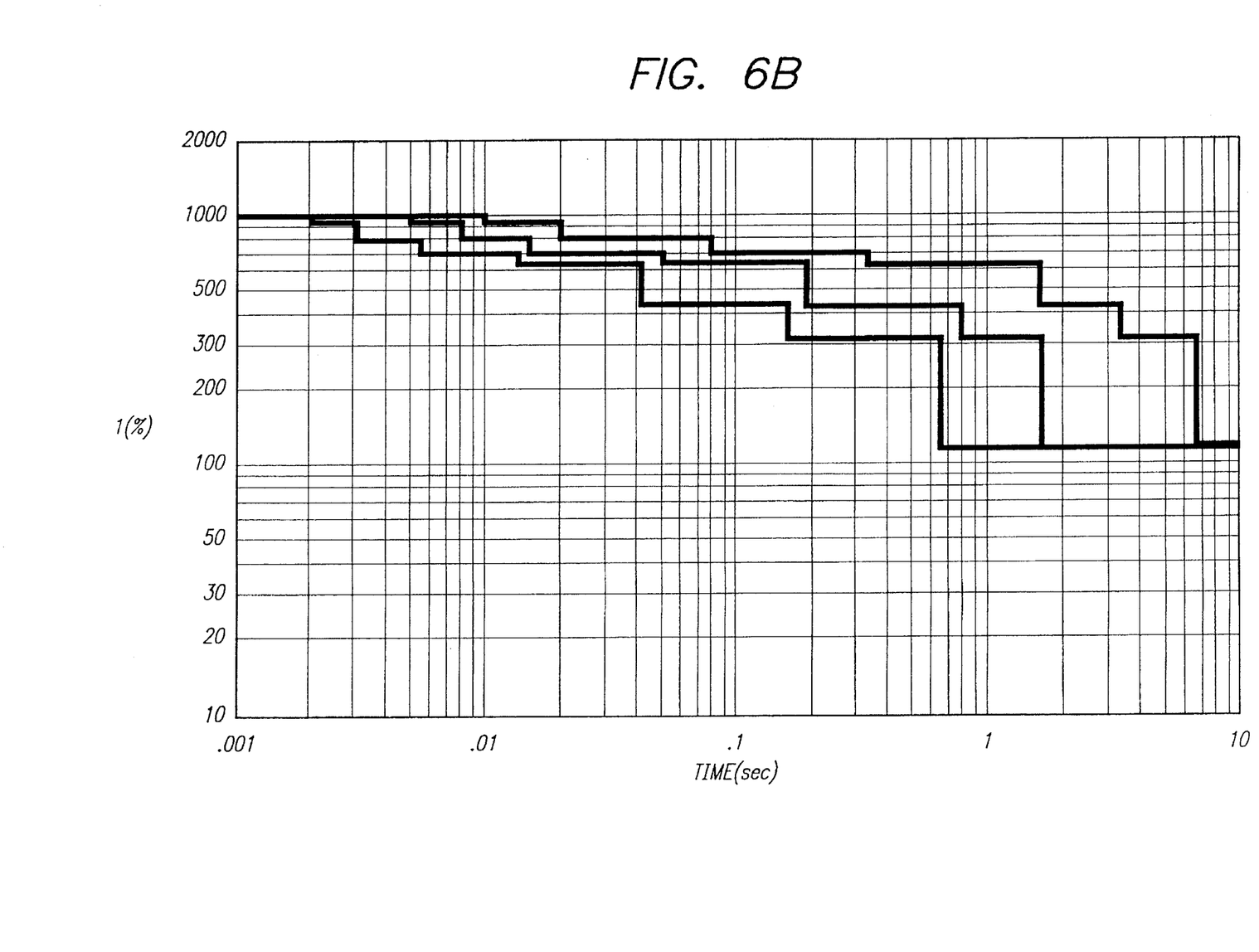
FIG. 6B is a graph of another series of trip curves implemented by the invention which differ primarily in the time over which any given overcurrent condition will be tolerated.

The programming variables DEVICE CONFIG 0, DEVICE CONFIG 1 and TRIP TIME SELECT originate with the system microprocessor 12 and serve to vary the trip characteristics implemented by the logic portion 48. Suitable trip characteristics are illustrated in FIGS. 6A and 6B as decreasing step functions representing the percentage of overcurrent verses the time over which the current at a given level is present. Referring specifically to FIG. 6A, a complex trip curve is shown for three different programmable conditions which differ only in the magnitude of the current rating of the power control devices to which they apply. The type and shape of the trip curve is established by the TRIP TIME SELECT input 70 from the system microprocessor 12, whereas the vertical position of the curve represents the amperage rating of the device and is established by the DEVICE CONFIG 0 and 1 inputs. These characteristics can be modified by changing the programming inputs, either before the device is set into operation or while is operating. Taking the middle curve of FIG. 6A as an example, a current equal to 1000 percent of the rated current would be tolerable in this scenario for 10 milliseconds, but not for 15 milliseconds. As the time over which a current is present increases, the level of tolerable current decreases. This is due to the heat that builds up in the system wiring when an overcurrent is present. Another dimension is added to the programmability of the systems 10 and 30 by the TRIP TIME SELECT input 70. Operating through the decoder 72 and the initial value select circuit 68, the TRIP TIME SELECT signal sets the initial (and maximum) value of the up/down counter 64. This, too, is related to heat build-up.

With reference to FIG. 6B, the three illustrated curves have the same step characteristics and the same values for each step, but the steps are shifted in time depending on the tolerance of a particular load circuit for high currents. Focussing on the curve shifted furthest to the left, in that case the count provided by the initial value select circuitry 68 is sufficiently low to cause the counter 64 to generate a trip signal if a current 1000 percent of rated current is present for as little as 2 milliseconds. By contrast, the curve shifted furthest to the right will not trip until a current 1000 percent of rated value is present for 10 milliseconds. In either case, if the overcurrent conditions ceases for a period of time, the up/down counter 64 will begin counting back up toward its maximum value, delaying any subsequent trip due to a recurrence of the high current condition.

In reference to FIG. 4, the DC power control device 20 preferably has a total of four lines joining it with the logic portion 48. All four are coupled to the power side of the power control device 20 by optoisolators or other isolation circuitry 40. One of these signals, identified in FIG. 4 as VSTATUS, is generated by a voltage detection circuit 80 which senses the line voltage available for application to the load. Thus, IVALUE and VSTATUS are the two status signals transmitted to the logic portion 48 by the power control device 20. Each of them are separately isolated from the power side of the device and therefore give accurate feedback to the logic portion 48 and the system microprocessor 12. Referring to FIG. 3, the VSTATUS signal passes along a line 82 to the control logic 74, which conditions it and sends it to the system microprocessor 12 along the data bus 24 (see FIG. 1).

The other two signals passing between the logic portion 48 and the DC power control device 20 are a GAIN signal and a MOSFET CONTROL signal. The GAIN signal passes through one of the isolation circuits 40, selects a required gain setting for the amplifier gain selection circuit 84, and is applied to the current sensing amplifier 36 of the IVALUE circuitry. Thus, the GAIN signal is used to set the level of amplification applied to the sensed current signal before the latter becomes the input of the voltage controlled isolator 38 and is passed through the isolation circuitry 40 as a pulse-width modulated square-wave signal. The GAIN input is initially received from the system microprocessor 12 and is passed through the logic portion 48 unchanged. With reference to FIG. 3, it enters the logic portion 48 as the DEVICE CONFIG 2 signal on the left hand side of the diagram and exits on the right hand side as the GAIN signal.

The MOSFET CONTROL signal is received from the logic portion 48 along the line 78 of FIG. 3. It serves both as a control on/off signal responsive to the system microprocessor 12 and as a "trip" signal indicating that the trip characteristic imposed by the system microprocessor has been exceeded. This signal is applied to a MOSFET gate driver 86 and then to a power MOSFET 88 which opens and closes the circuit to the load.

The AC power control device 32 is similar in most respects to the DC power control device 20, with the exception that it has a pair of power MOSFETS 88 to interrupt AC current flowing in both directions. In addition to the second power MOSFET, the AC power control device 32 has a zero current/zero voltage crossing detection circuit 90 required for use with AC power. In addition to being connected between the MOSFET control input and the MOSFET gate driver 86, the zero crossing detector circuit 90 is connected between the "hot" input of the AC line power and the load itself.

In addition to the foregoing, the control logic 74 of the logic portion 48 generates and provides additional system status signals to the microprocessor 12. These include those identified in FIG. 3 as ISTATUS, FAIL, OC TRIP. They give the system microprocessor 12 a complete picture of system operation and permit it to reprogram the essential variables accordingly.

In operation, the microprocessor 12 initially provides appropriate DEVICE CONFIG and TRIP TIME SELECT inputs to configure the power control devices. This includes establishing a rated current for each of the control devices, as well as programming the precise trip curve desired. As soon as the device begins operating, status signals are generated by the power control devices. The most important status signal is the IVALUE signal generated in response to current across the shunt resistor 42. It is converted to a voltage, applied to the voltage-controlled oscillator 38 to create a pulse-width modulated signal, and passed across the isolation circuitry 40 to create a square-wave signal having a pulse-width representative of the load current. The square-wave signal is decoded by the counter 50, the decoder 52 and the comparator 56 to create signals on a plurality of comparator output lines which together indicate the level of current in the load.

The multiplexer 58 uses the programming inputs DEVICE CONFIG 0 and DEVICE CONFIG 1 to select the appropriate comparator output lines. With the appropriate lines selected, the multiplexer uses the signals on these lines to generate the overcurrent signal applied to the up/down counter 64 along the line 62, and select the proper clock input for application to the up/down counter 64 as a trip clock indicative of the severity of the overcurrent condition. The counter 64 then integrates the trip clock input up or down, depending on whether the current is above or below 120 percent of its rated value, until the counter reaches zero. A trip signal is then sent to the power MOSFET(s) via the line 76, the control logic 74 and the line 78. Reprogramming can, of course, be accomplished by merely changing the various inputs from the system microprocessor 12.

From the above, it can be seen that the system and method of the present invention provide a highly flexible and programmable system wherein all or most of the power control devices can be physically identical, with a master computer providing all required configuration data.

While the preferred embodiments have been described and illustrated, various substitutions and modifications may be made thereto without departing from the scope of the invention. Accordingly, it is to be understood that the present invention has been described by way of illustration and not limitation.

What is claimed is:

1. A multichannel power distribution system for individually controlling power from at least one source to a plurality of loads, comprising:

a plurality of power control devices, each connectable between said at least one source and one of said loads, the power control devices providing at least one status signal representative of current or voltage at the load;

at least one logic stage responsive to said status signals to impose preselected operational characteristics on the power control devices; and isolation circuitry between the power control devices and the logic stage;

the isolation circuitry having a modulator for converting the status signal to a status pulse train of modulated pulse width; and the logic stage including decoder logic for measuring the pulse width of the status pulse train.

2. The multichannel power distribution system of claim 1 wherein:

a single logic stage communicates with and controls a plurality of said power control devices.

3. The multichannel power distribution system of claim 1 wherein:

the modulator comprises a voltage-to-frequency converter connected to an optoisolator to produce a digital signal having a pulse width representative of the current through one of the loads.

4. The multichannel power distribution system of claim 1 wherein:

the decoder logic measures the pulse width on a pulse-by-pulse basis.

5. The multichannel power distribution system of claim 1 wherein the logic stage further comprises:

logic for processing the measured pulse width to detect a possible overcurrent condition; and logic for sending a trip signal to a corresponding one of said power control devices when an overcurrent condition is detected.

6. The multichannel power distribution system of claim 5 wherein the decoder logic comprises:

a clock producing a series of clock pulses; and logic for counting the number of clock pulses occurring in a period of said status pulse train.

7. The multichannel power distribution system of claim 6 wherein:

the clock pulses are substantially higher in frequency than the status pulse train.

8. The multichannel power distribution system of claim 6 wherein:

the logic for processing the measured pulse width compares the number of clock pulses occurring in a single period of the status pulse train with preselected values representing a plurality of different current levels, and produces a detected current signal representing the level of current through said loads.

9. The multichannel power distribution system of claim 8 wherein:

the logic for processing the measured pulse width further comprises:

logic acting in response to the detected current signal to generate a second train of clock pulses at a rate representative of the current through said load;

logic responsive to the detected current signal for generating an overcurrent signal indicative of whether the current through said load exceeds a rated value by at least a preselected amount; and an up/down counter responsive to the overcurrent signal to integrate the second train of clock pulses and generate a trip signal when the current to the load, and the time over which it is present, combine to exceed a maximum permissible load current condition.

10. The multichannel power distribution system of claim 1 wherein:

said at least one logic stage is programmable to alter said operational characteristics in response to an external input.

11. The multichannel power distribution system of claim 10 wherein:

said operational characteristics are programmable from a remote location.

12. The multichannel power distribution system of claim 10 wherein:

said operational characteristics are programmable by software control.

13. The multichannel power distribution system of claim 10 wherein:

said operational characteristics are programmable as the system operates.

14. A multichannel power distribution system for individually controlling power from at least one source to a plurality of loads, comprising:

a system processing unit;

a plurality of power control devices remote from said processing unit, each of said power control devices connectable between said at least one source and one of said loads to generate a status signal;

a logic stage connected individually to a plurality of said power control devices to concurrently process a respective status signal from each of said power control devices to impose certain preselected operational characteristics defined by said system processing unit on the power control devices;

said logic stage being programmable by said processing unit to alter said preselected operational characteristics of said power control devices.

15. The multichannel power distribution system of claim 14 wherein:

said logic stage is adjacent said plurality of power control devices.

16. The multichannel power distribution system of claim 14 wherein:

said operational characteristics are programmable by software control.

17. The multichannel power distribution system of claim 14 wherein:

said operational characteristics are programmable as the system operates to control power to said loads.

18. The multichannel power distribution system of claim 14 wherein:

said operational characteristics include power ratings for the power control devices.

19. The multichannel power distribution system of claim 14 wherein:

said operational characteristics comprise maximum load currents and the time periods over which such currents can be tolerated.

20. The multichannel power distribution system of claim 19 wherein:

the maximum load currents are programmable from a remote location.

21. The multichannel power distribution system of claim 19 wherein:

the time periods are programmable from a remote location.

22. The multichannel power distribution system of claim 14 wherein:

said operational characteristics comprise trip characteristics defining maximum permissible currents through each load as a function of time.

23. The multichannel power distribution system of claim 22 wherein:

said trip characteristics decrease as a function of time.

24. The multichannel power distribution system of claim 23 wherein:

said trip characteristics decrease as a stepped function.

25. The multichannel power distribution system of claim 23 wherein:

said logic stage is programmable to switch between a plurality of said trip characteristics for each load.

26. A multichannel method for individually controlling power from at least one source to a plurality of loads, comprising:

providing a plurality of power control devices, each connected between said at least one source and one of said loads;

generating at least one status signal representative of current or voltage at the load;

using a logic stage to impose preselected operational characteristics on the power control devices in response to said status signals;

electronically isolating the power control devices from the logic stage by converting the status signal to a status pulse train of modulated pulse width and passing the status pulse train across an isolation device; and decoding the status pulse train by measuring its pulse width.

27. The multichannel method of claim 26 wherein:

the status signal is converted by passing it through a voltage-to-frequency converter connected to an optoisolator to produce a digital signal having a pulse width representative of the current through one of the loads.

28. The multichannel method of claim 26 wherein:

the pulse width is measured on a pulse-by-pulse basis.

29. The multichannel method of claim 26 which further comprises the steps of:

processing the measured pulse width to detect a possible overcurrent condition; and sending a trip signal to a corresponding one of said power control devices when an overcurrent condition is detected.

30. The multichannel method of claim 29 wherein the decoding step comprises:

providing a clock producing a series of clock pulses; and counting the number of clock pulses occurring in a period of said status pulse train.

31. The multichannel method of claim 30 wherein:

the clock pulses are substantially higher in frequency than the status pulse train.

32. The multichannel method of claim 30 wherein the step of processing the measured pulse width comprises:

comparing the number of clock pulses occurring in a single period of the status pulse train with preselected values representing a plurality of different current levels, and using the results of the comparison to produce a detected current signal representing the level of current through said loads.

33. The multichannel method of claim 32 wherein the step of processing the measured pulse width further comprises:

generating a second train of clock pulses at a rate representative of the current through said load;

generating an overcurrent signal indicative of whether the current through said load is exceeded by a preselected amount; and integrating the second train of clock pulses and generating a trip signal when the current to the load, and the time over which it is present, combine to exceed a maximum permissible load current condition.

34. The multichannel method of claim 26 which further comprises the step of:

programming said operational characteristics in response to an external input.

35. The multichannel method of claim 34 which further comprises the step of:

programming said operational characteristics from a remote location.

36. The multichannel method of claim 34 which further comprises the step of:

programming said operational characteristics by software control.

37. The multichannel method of claim 34 which further comprises the step of:

programming said operational characteristics as the system operates.

38. A multichannel method for individually controlling power from at least one source to a plurality of loads, comprising:

providing a system processing unit;

providing a plurality of power control devices remote from said processing unit, each of said power control devices connectable between said at least one source and one of said loads to generate a status signal;

using a logic stage to concurrently process a respective status signal from each of said power control devices to impose certain preselected operational characteristics defined by said system processing unit on the power control devices, said logic stage being connected individually to said plurality of power control devices; and programming the logic stage using said processing unit to alter said preselected operational characteristics of said power control devices.

39. The multichannel method of claim 38 wherein the programming step comprises:

programming said operational characteristics from a remote location.

40. The multichannel method of claim 38 wherein the programming step comprises:

programming said operational characteristics by software control.

41. The multichannel method of claim 38 wherein the programming step comprises:

programming said operational characteristics as the system operates to control power to said loads.

42. The multichannel method of claim 38 wherein:

the programmable operational characteristics include power ratings for the power control devices.

43. The multichannel method of claim 38 wherein:

the programmable operational characteristics comprise maximum load currents and the time periods over which such currents can be tolerated.

44. The multichannel method of claim 38 wherein:

the programmable operational characteristics comprise trip characteristics defining maximum permissible currents through each load as a function of time.

45. The multichannel method of claim 44 wherein:

said trip characteristics decrease as a function of time.

46. The multichannel method of claim 45 wherein:

said trip characteristics decrease as a stepped function.

47. The multichannel method of claim 45 wherein:

said at least one logic stage is programmable to switch between a plurality of said trip characteristics for each load.

* * * * *